United States Patent
Naik et al.

(10) Patent No.: US 10,184,063 B2
(45) Date of Patent: Jan. 22, 2019

(54) TOP COATING FOR LABEL FACE STOCK, METHOD FOR PROVIDING THE TOP COATING AND TOP COATED LABEL FACE STOCK

(71) Applicant: UPM Raflatac Oy, Tampere (FI)

(72) Inventors: Kirit Naik, Arden, NC (US); Jessica May, Hendersonville, NC (US)

(73) Assignee: UPM RAFLATAC OY, Tampere (FI)

( * ) Notice: Subject to any disclaimer, the term of this patent is extended or adjusted under 35 U.S.C. 154(b) by 43 days.

(21) Appl. No.: 15/387,852

(22) Filed: Dec. 22, 2016

(65) Prior Publication Data

US 2018/0179411 A1    Jun. 28, 2018

(51) Int. Cl.
  *C09D 133/00*    (2006.01)
  *C09D 175/04*    (2006.01)
  *C09D 175/14*    (2006.01)

(52) U.S. Cl.
  CPC ................. *C09D 133/00* (2013.01)

(58) Field of Classification Search
  CPC ... C09D 133/00; C09D 175/04; C09D 175/14
  USPC ........... 525/50; 428/423.7, 424.8; 427/372.2
  See application file for complete search history.

(56) References Cited

U.S. PATENT DOCUMENTS

| | | | | |
|---|---|---|---|---|
| 4,598,120 A | * | 7/1986 | Thoma | C09D 175/04 524/588 |
| 2003/0027917 A1 | * | 2/2003 | Namiki | C08G 18/10 524/492 |
| 2003/0180541 A1 | * | 9/2003 | Naik | B41M 5/52 428/423.1 |

FOREIGN PATENT DOCUMENTS

CN    101899235 A    * 12/2010

* cited by examiner

*Primary Examiner* — Thao T Tran
(74) *Attorney, Agent, or Firm* — Cantor Colburn LLP

(57) ABSTRACT

The invention relates to an aqueous top coating composition for label face stock. The coating includes at least the following components: an emulsion of acrylic polymers, a dispersion of urethane polymers, a cross linker, and a dispersion of aliphatic polyurethane/acrylic polymer exhibiting isocyanate (NCO) to hydroxyl (OH) ratio above 1.7. The invention further relates to a label face stock comprising a top coating layer of the aqueous top coating composition and method for providing the aqueous top coating composition.

11 Claims, 2 Drawing Sheets

TOP COATING FOR LABEL FACE STOCK, METHOD FOR PROVIDING THE TOP COATING AND TOP COATED LABEL FACE STOCK

TECHNICAL FIELD

The present application relates to surface treatment of label face stocks, and especially to top coating compositions for face stock materials and to labels comprising said top coating.

BACKGROUND

It is general practice to provide a surface treatment on a face stock of a label. This is often necessary for filmic face stock materials which without further surface treatment may have significantly poorer printability compared to paper face stock materials. Surface treatment may be used in order to improve the printability of the label, but it may also be used to enhance other properties of the surface. For example, top coating may be used for enhancing ink anchorage, moisture resistance, optical and/or antiblocking properties, slip (coefficient of friction), antistatic properties or resistance to mechanical damages.

SUMMARY

It is an aim of the embodiments to provide a top coating composition for label facestock so as to enhance the surface properties of the face stock. Further it is an aim to provide a top coated label face stock and method for providing the top coating.

One embodiment provides an aqueous top coating composition for label face stocks, wherein the top coating comprises: emulsion of acrylic polymers, dispersion of urethane polymers, cross linker, and dispersion of aliphatic polyurethane/acrylic polymer exhibiting isocyanate (NCO) to hydroxyl (OH) ratio above 1.7.

One embodiment provides a label face stock comprising a top coating layer consisting of an aqueous top coating composition on a surface of the face stock.

One embodiment provides a method for providing an aqueous top coating composition onto a surface of a face stock of a label, wherein the method comprises: applying the aqueous top coating composition onto the surface of the face stock, drying and curing the aqueous top coating composition during the in line label laminate manufacturing process.

Further embodiments of the application are presented in the dependent claims.

In an example, the aliphatic polyurethane/acrylic polymer includes 25% of acrylic parts.

In an example, the aliphatic polyurethane/acrylic polymer exhibits a peak of glass transition temperature at 57° C.

In an example, the aliphatic polyurethane/acrylic polymer exhibits isocyanate (NCO) to hydroxyl (OH) ratio of 2.

In an example, the aqueous top coating composition further comprises a foam control agent.

In an example, an amount of the emulsion acrylic copolymers is between 10 and 50%.

In an example, an amount of the dispersion of aliphatic urethane is up to 40%.

In an example, an amount of the dispersion of aliphatic polyurethane/acrylic polymer is between 15 and 60%.

In an example, an amount of the cross linker is less than 7%.

In an example, the cross linker is propylene imine.

In an example, an amount of the foam control agent is less than 1%.

In an example, the face stock comprises thermoplastic polymer(s).

In an example, the top coating layer exhibits static coefficient of friction against a polyethylene terephthalate liner less than 0.15, preferably less than 0.12.

BRIEF DESCRIPTION OF THE DRAWINGS

In the following some examples and embodiments of the invention will be described in more detail with reference to appended drawings, in which.

DETAILED DESCRIPTION

Figure 1:
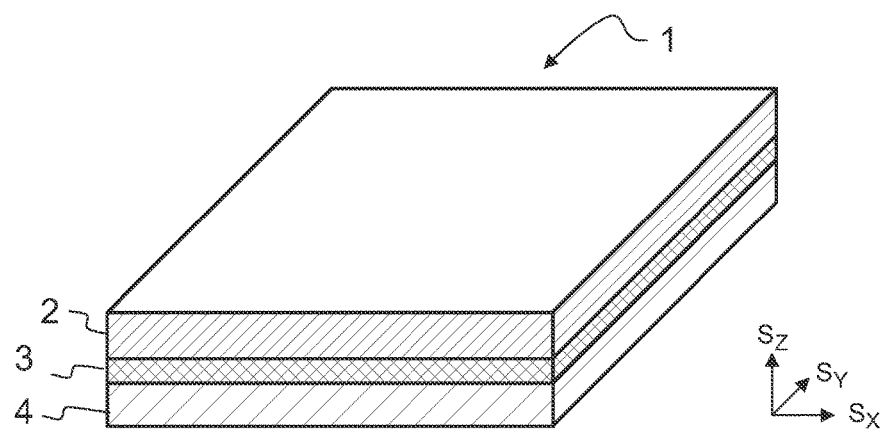
FIG. 1 shows a label laminate.

In this description and claims, word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:

MRK1 printed graphics,
Sx, Sy, Sz 3D coordinates,
1 a label laminate,
2 a face stock,
3 an adhesive layer,
4 a release liner,
11 a label,
21 a top coating layer,
22 a printable face stock,
23 a printed face stock.

Term label refers to a piece of material carrying information and/or providing visual appearance, which is to be applied onto items of different shapes and materials. An item may be a package, such as a bottle. A label comprises at least a face stock. The face stock is printable. Usually the label comprises also an adhesive layer. A label consisting of a face stock, graphics i.e. printed layer and an adhesive layer may be referred to as a printed label. A label comprising an adhesive layer of pressure sensitive adhesive may be referred to as a pressure sensitive adhesive (PSA) label. Pressure sensitive adhesive labels may also be referred to as self-adhesive labels. The labels consisting of PSA can be adhered to most surfaces through an adhesive layer without the use of a secondary agent, such as a solvent, or heat to strengthen the bond. The PSA forms a bond when pressure is applied onto the label at ambient temperature (e.g. between 15 and 35° C.), adhering the label to the item to be labelled. Examples of pressure sensitive adhesives include water based (water-borne) PSAs, solvent based PSAs and solid PSAs. Solid PSAs are melted during application to the surface to be coated and may also be referred to as a hot-melt PSAs. A label may further comprise other adhesive(s). A label laminate, further comprises a release liner for protecting the adhesive layer. The face stock and the release liner are typically laminated together having an adhesive layer in between, which laminated structure is referred to as a label laminate. The release liner is used to protect the adhesive layer. It also allows easier handling of the label to up to the point of labelling where the label face stock is dispensed and adhered to a surface of an item. In labelling the release liner is removed and disposed of. Thus, release liners of the label laminates serve one or more useful functions: they are used as a carrier sheet onto which the adhesive may be coated; they protect the adhesive layer during storage and transportation; they provide a support for labels during die-cutting and printing, and ultimately they release from the adhesive leaving it undamaged.

Term shrinkable refers to a property of a film or a label made thereof to shrink under exposure to external energy. In an example, a shrinkable film shrinks when exposed to an elevated temperature. Heat may be applied via hot air. Alternatively, heat may be applied via infra-red radiation (IR) or steam or combination of these. In response to application of heat, the plastic film or a label comprising said film is arranged to shrink.

Terms heat shrink film and heat shrink label refer to a film and a label comprising said film having low or high shrinkage in elevated temperatures clearly above normal room or storage temperatures. For example, films may have at least 15% or at least 25%, or at least 35% or in some cases more than 55% or even more than 75% shrinkage between temperature of 65 and 98° C. in the predefined direction of the shrink film and label produced thereof. Due to the shrinking capability, the heat shrink label is able to form a tight fitting label around the item when exposed to external energy, such as heat. Below 65° C. shrinkage is less than 15%. In an example, below 50° C. shrinkage is less than 10%. For example, shrinkage may between 0 and 15%, or between 1 and 10% below 65° C. Such low or non-existing shrinkage in these lower temperatures, below 65° C., is essential to allow transportation and/or conversion (for example printing) of label materials without the label materials undergoing unwanted shrinkage prior to the actual labelling phase.

A heat shrink label comprises or consists of a heat shrink film and is suitable to be fitted around an article to be labelled and shrunk around the article when exposed to external energy, such as elevated temperature. In addition, a heat shrink label comprises at least some graphics on a surface of the heat shrink film. A heat shrink label may be a sleeve label (HS), wherein the film is mainly oriented in transverse direction and applied around an item as a preformed tube. Alternatively, a heat shrink label may be a roll-fed shrink film (RFS), which is oriented in machine direction. The film is applied in an on-line process over an item and subsequently shrunk. A heat shrink film without additional graphics, such as printing, may be used, for example, as a shrinking seal label, a tamper evident label or security label.

Labels may be used in wide variety of labelling applications and end-use areas, such as beverage labelling, food labelling, home and personal care product labelling, and labelling of industrial products. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethylene terephthalate (PET) bottles, and bottles made of polyolefin, such as high density polyethylene (HDPE) and polypropylene (PP). The label may surround the labelled article, such as a bottle, completely or partially.

Term face stock, also called as face film or face material, refers to a layer of a label that is adhered to the surface of an item during labelling through an adhesive layer. The face stock may comprise printing in order to provide information and/or visual effect, such as information of the content of the item labelled. The face stock may have a monolayer or multilayer structure. Further, the face stock may be opaque, such as white film, or transparent to any desired degree.

Term printable surface refers to a surface that is suitable for printing. In an example, surface of a face stock is printable. Printable surface is able to receive printing inks, other printable compositions and printed graphics (including images, text etc.) made thereof. Printable surface has also an ability to provide suitable anchorage of the graphics and good overall print quality. Graphics may be provided by conventional printing methods, such as gravure or flexographic (incl. UV flexo) processes. Alternatively printing methods, such as digital printing (inkjet or xerography), offset lithography or screen printing may be used. In addition, the printable surface should be suitable for printing with high printing speeds. Thus, good running properties of the face stock and anti-blocking properties are required when the face stock is provided from a roll to further processing, such as printing. Printable surface needs to have sufficiently high surface energy determining of wetting characteristics of the face material. Surface energy can't be measured directly. The property can be deduced by measuring substitute property of wetting tension, which involves observation of the behaviour of liquids placed on the film surface e.g. according to the standard ASTM D-2578. Wetting tension is the maximum liquid surface tension that will spread on the film surface. Thus, the wetting tension is a measurable property estimating the surface energy of the film. A low surface energy may lead to poor retaining capability of printing ink applied to the surface. For example, a printable face stock may have a wetting tension clearly above 30 dynes/cm, for example at least 36 dynes/cm and above, preferably at least 38 dynes/cm, or even above at least 44 dynes/cm, when measured according to the standard ASTM D-2578.

Good print quality refers to printed graphics having at least some/all of the following: good enough anchorage, moisture resistance, resistance to smearing and fading, sharpness and evenness of the printed graphics.

Adjacent refers to a structural arrangement, where a layer is next to another layer. Adjacent layers are in contact with each other and no additional layers are between the layers.

Underlying/overlaying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Topmost (outermost, uppermost, upmost) surface refers to a label structure, where the topmost surface forms upper part of the structure arranged opposite to the undermost surface of the label, which is adjacent to the surface of an item when labelled. In an example, topmost layer of a printed top coated label is the top coating layer comprising printed graphics.

Undermost (lowermost) layer refers to a layer forming bottom part of the structure arranged opposite to the topmost layer. Undermost layer of a label is in contact with the surface of an article when labelled. Undermost layer of a printed top coated label is the adhesive layer. In a label laminate structure the undermost layer is a release liner.

Dispersion refers to a solution comprised of small solid particles dispersed in a second phase, most commonly water.

Emulsion refers to a uniform mixture of two immiscible liquids.

Aqueous coating composition refers to a solution in which the solvent is water. Aqueous coating composition comprises water-borne components dispersed or emulsified in the water.

Term haze refers to a property used to describe transparency of a face stock or a top coating layer. Haze relates to scattering of light by a film that results in a cloudy appearance of the film. Haze corresponds to the percentage of light transmitted through a film that is deflected from the direction of the incoming light. Haze may be measured according to standard ASTM D1003.

Label Structure

Figure 2:
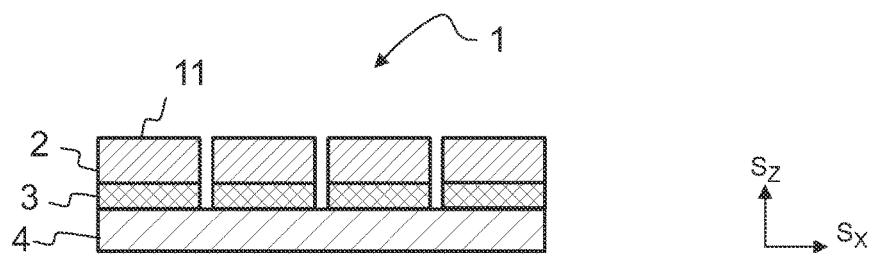
FIG. 2 shows a continuous label laminate web comprising cut labels.

Referring to FIG. 1 a label laminate 1 refers to a structure comprising a face stock 2, an adhesive layer 3 and a release liner 4. Label laminate web has a continuous label laminate structure. Individual labels 11 are die-cut from the continuous label laminate web. Referring to FIG. 2, a label laminate structure 1 comprises four cut labels 11 attached to a common release liner 4. During labelling the release liner 4 is removed and the label 11 is attached onto the surface to be labelled through the adhesive layer 3. Thus, a label 11 to be labelled comprises a face stock 2 and an adhesive layer 3. Further the label typically includes graphical patterns MRK1 on the surface of the face stock 2. In an example, a topmost surface of the face stock 2 comprises printing. Alternatively, a label may be a heat shrink label comprising shrinkable film.

Face Stock

In an example, a face stock comprises thermoplastic polymer(s), such as polyolefin, for example polyethylene (PE) and/or polypropylene (PP). Alternatively, a face stock comprises polyesters, such as polyethylene terephthalate (PET). The face stock may also be metalized, such as metalized polypropylene or metalized polyester. Alternatively, the plastic film, such as polypropylene film, may be cavitated. The face film may be rigid, such as PET or PP film. Alternatively it may be semiconformable, such as hybrid film comprising both PP and PE. Still alternatively, it may be superconformable, such as machine direction oriented polyolefin film. The face stock may have a monolayer structure. Alternatively, it may have multilayer structure comprising two or more layers. A multilayer face film may have a three layer structure. Alternatively, a multilayer face film may comprise five or even more layers. The face stock may have total thickness in the range of about 10-150 µm, for example, in the range of about 10-80 µm, 20-60 µm, or 10-40 µm.

The face stock may be transparent or clear. From the optical point of view, high transparency of the labels may be preferred. Transparent (clear) labels are substantially transparent to visible light. Transparent no label look appearance of the label is advantageous, for example, in applications where the objects beneath the label, i.e. the surface of a bottle, should be visible through the label. Clarity of the face stock and a label comprising said face stock can be measured and evaluated by the haze values. The haze of the face film may be lower than 25%, or lower than 10%, for example 2-6%, or 3-5%. Haze is tested according to standard ASTM D1003.

Alternatively, the face film may be opaque and/or white. In an embodiment of an opaque face film, the face comprises additive to provide a desired colour. An additive may comprise one or more pigments or inorganic fillers, for example titanium dioxide, calcium carbonate and/or combination of those. In a multilayer film structure the pigment may be included in one or more of the layers. As an example, a black face film is provided with additive carbon black. An opaque face stock may have an opacity of at least 70%, or at least 75%, or at least 80% when measured according to the standard ISO 2471. Opacity may be 70-95%, or preferably 70-80%. Alternatively, opacity may be less than 12%, when measured according to the standard ISO 2471.

For example, a face stock may have a wetting tension, of the face material, above 30 dynes/cm, for example at least 36 dynes/cm, when measured according to the standard ASTM D-2578. Surface energy of the face stock may be increased, for example by corona treatment. In an example, corona treated face stock may have wetting tension between 36 and 44 dynes/cm.

Top Coating Layer

According to an embodiment and in order to improve printability of a face stock layer 2 of a PSA label or a plastic film of a shrinkable label, a top coating layer 21 to which printed graphics MRK1 can be applied is provided onto the surface of the face stock layer or the plastic film. In an example, a top coating layer is applied onto an upside surface of the face stock or plastic film. Alternatively, a top coating layer is applied onto the underside (reverse side) surface. Alternatively, a top coating layer may be provided onto the both surfaces.

Figure 3:
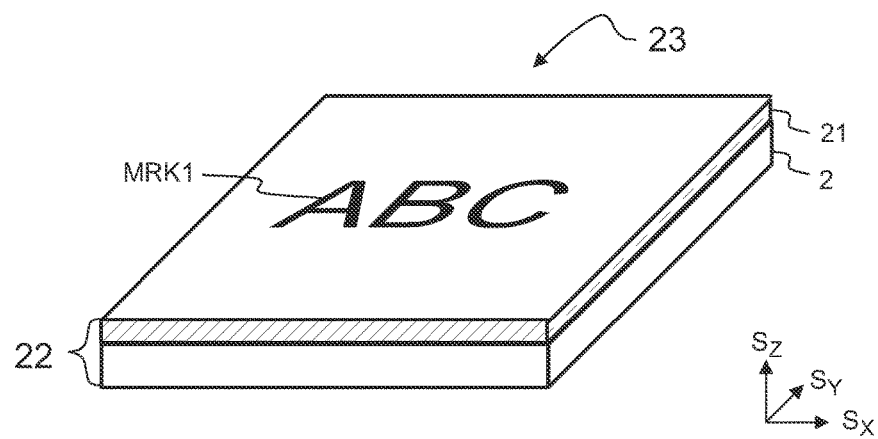
FIG. 3 shows a printable face stock.

Referring to FIG. 3 a face stock 2 comprises a top coating layer 21 thus providing printable face stock 22. In a printable face stock 22, the top coating layer forms the topmost layer and a surface receiving the printed graphics MRK1.

According to an example, a label laminate has following structure: (overcoat if any), print, top coating layer, filmic face (transparent or opaque), adhesive, liner.

According to another example, a label laminate has following structure: (overcoat if any), filmic transparent face, top coating layer, print, (overcoat of the print if any), adhesive, liner.

According to an example, a shrink film of a shrinkable label comprises the following structure: (overcoat if any), print, top coating layer, filmic face (transparent or opaque).

According to another example, a shrink film of a shrinkable label comprises the following structure: (overcoat if any), filmic transparent face, top coating layer, print, (overcoat of the print if any).

A primer coating may be used between the filmic face and the top coating layer in any of the above examples.

According to an embodiment, a top coating composition for the top coating layer 21 is aqueous based and comprises at least the following water-borne solid polymeric components in water: polyacrylate, polyurethane and polyurethane-acrylate. Further, the coating composition comprises a solid crosslinker. Total amount of the water-borne polymeric components may be between 93 and 99 wt. % of the top coating composition after drying. An amount of crosslinker may be equal or less than 7 wt. %, for example between 0.5 and 2%.

According to an embodiment, top coating composition for the top coating layer 21 is aqueous and comprises at least the following water-borne polymeric components: acrylic copolymer, aliphatic urethane, aliphatic polyurethane/acrylic, and water dispersible crosslinker, such as propylene imine or carbodiimide. Further the aqueous top coating composition may comprise additives, such as a foam control agent. Aliphatic urethane may be, for example, polyester-polyurethane. The water-borne polymeric components may include water i.e. water may be associated within the components, such as acrylic copolymer emulsion, aliphatic urethane dispersion, aliphatic polyurethane/acrylic dispersion. Thus the water associated within those components may be sufficient to achieve a desired water content for the aqueous coating composition. Alternatively, or in addition water may be added to produce aqueous coating composition with characteristics desired.

Following are provided components of an aqueous top coating composition. The percentages are weight percentages (wt. %) based upon the total weight (including water) of the resulting top coating composition.

In the top coating composition an amount of the acrylic copolymer emulsion may be between 10 and 50%. The amount of acrylic copolymer emulsion being between 10 and 50% may provide optimal ink adhesion and printing appearance without creating undesirable blocking of the top coating e.g. in environments exhibiting elevated temperature. The acrylic copolymer is anionic and has total solids content (w/w) between 40 and 42%, for example 41% solids in water. In an example, it has viscosity in the range 10-50 mPa·s (Brookfield at 25° C.). It may have effect on providing water resistance for the top coating layer. It may further have effect on providing improved ink adhesion and printing appearance. It may further have effect on providing good transparency.

In the top coating composition an amount of aliphatic urethane dispersion may be up to 40%. The aliphatic urethane dispersion has total solids content (w/w) between 32 and 34%, for example 33% solids in water. In an example, it has viscosity max 200 mPa·s (Brookfield at 25° C.). It may have effect on providing good adhesion for the top coating to the surface of the plastic face stock.

In the top coating composition an amount of aliphatic polyurethane/acrylic dispersion may be between 15 and 60%. The aliphatic polyurethane/acrylic dispersion has total solids content (w/w) between 39 and 41%, for example 40% solids in water. In an example, aliphatic polyurethane/acrylic dispersion has viscosity max 300 mPa·s (Brookfield at 25° C.). The ratio of isocyanate (NCO) to hydroxyl (OH) of the aliphatic polyurethane/acrylate is above 1.7, for example 2.0. The NCO/OH ratio accounts for the amount of urethane bonds. Urethane bonds are the hard segments in the polymer. In an example, polyurethane/acrylate exhibiting NCO/OH above 1.7, for example 2.0, comprises more hard segments than the polyurethane exhibiting NCO/OH less than 1.7, for example 1.6. Thus, higher the NCO/OH ratio higher the amount of hard segments in the polymer structure. Higher amount of hard blocks has effect on the overall hardenss of the polymer. In an example, pendulum hardness of the polyurethane/acrylate may be 95, when measured according to König method. König method evaluates hardness by measuring the damping time of oscillation pendulum. The measuring parameters are as follows: weight 200 g±0.2, diameter 5 mm, deflection start 6°, deflection end 3°, period of oscillation 1.4 s, damping time on glass 250±10 s. Higher amount of hard blocks may further have effect on reducing the blocking sensitivity of the polymer. The aliphatic polyurethane/acrylate may comprise, for example 25% of acrylics. In an example, the polyurethane/acrylate exhibits glass transition temperature (Tg) of between 55 and 58° C., for example 57° C. This may further have effect on the increased hardness and low blocking tendency of the polyurethane/acrylate when compared to for example polyurethane.

The aliphatic polyurethane/acrylic dispersion may further have effect on providing good adhesion for the top coating to the surface of the plastic face stock. It may also provide excellent chemical and scratch resistance. Further, it may have effect on printability of the top coating layer.

In the top coating composition an amount of crosslinker is less than 7%. An amount of propylene imine crosslinker may be between 0.1 and 7%. The crosslinker has total solids content of 100%. The corsslinker consist of active polyfunctional aziridine liquid crosslinker. In an example, it has viscosity between 100 and 300 mPa·s (Brookfield at 25° C.). It may have effect on providing improvement in water, chemical and abrasion resistance of the top coating layer.

In the top coating composition an amount of additives may be less than 1%, for example between 0.1 and 1%. In an example, the coating composition may comprise an additive of foam control agent comprising silica derivatives, mineral oil and esters. In an example, it has viscosity 925 cPs (Brookfield RVT #3, 20 rpm, 25° C.).

Top coating composition may be applied onto the surface of the face stock or shrink film by using conventional application techniques, such as gravure coating, Meyer rod coating, slot die coating, curtain coating, reverse roll coating, knife over roll coating, air knife coating or immersion coating. Prior to coating the face material surface may be corona treated so as to increase the top coating anchorage. Amount of top coating may be from 0.1 to 1 gsm (g/m$^2$).

After application the top coating composition is rapidly dried and allowed to cure (i.e. crosslink). In an example, the drying is provided at elevated temperature by heating, for example in hot air oven. In an example, drying (curing) temperature may be between 80 and 90° C. Drying time period in the elevated temperature be 1 to 2 seconds. Thickness of the coating layer after drying may be between 0.05 and 2 μm.

Preferably the top coating and subsequent drying/crosslinking are provided in line during label laminate manufacturing. In line manufacturing means that the film is top coated in the same process prior to the following steps wherein the film becomes laminated together with the liner (and PSA in between). In an example, a speed of the continuous face film during label laminate manufacturing may be between 300 and 600 m/min; drying time of the top coating 1 to 2 second in an oven having temperature between 80 and 90° C.

At least some/all top coating embodiments have effect on improving the printability of the label face stock. Top coating may also has effect on quality of the printed graphics. Top coating provides a printable surface and is able to receive printing inks and printed graphics (including images, text etc.) made thereof. Top coating layer is suitable for printing by using, for example, water based inks, UV curing inks (UV flexo, UV screen, UV offset), white screen inks and cold foil adhesives. Top coating layer has also an ability to provide suitable anchorage of the graphics and good overall print quality.

At least some/all top coating embodiments have effect on providing good adhesion to the surface of the face stock. They may also provide excellent ink adhesion. In an example, the wetting tension indicating surface energy of the top coated face stock may be may be clearly above 30 dynes/cm, for example between 36 and 60 dynes/cm, between 38 and 56 dynes/cm, or between 44 and 50 dynes/cm, when measured according to the standard ASTM D-2578. The wetting tension level may also be maintained higher than or equal to 38 dynes/cm after 50 or 120 days. The wetting tension may lead to a good adhesion of the printing ink applied to the top coated surface.

At least some/all top coating embodiments may also have effect on providing good chemical resistance properties, for example resistance to isopropyl alcohol (IPA). For example, optical density of the film is not adversely affected when the film is treated with IPA. In other words, film's light blocking ability is not affected due to the IPA treatment.

At least some/all top coating embodiments may have effect on providing haze less than 1%, for example between 0.07 and 0.9%, when tested according to standard ASTM D1003.

Figure 4:
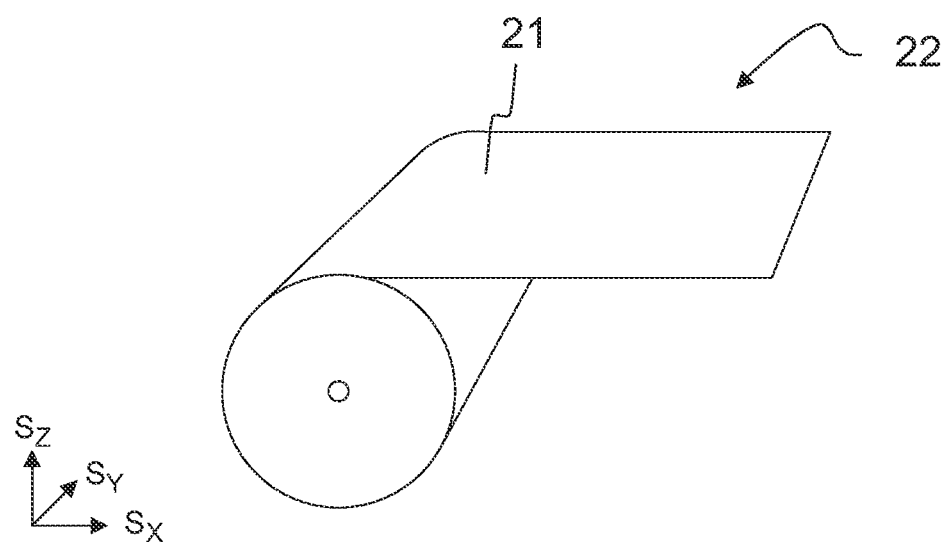
FIG. 4 shows a printable face stock in a roll.

Further at least some/all top coating embodiments may have effect on preventing undesirable blocking i.e. preventing unwanted adhesion of the top coated layer to the other side (backside) of the face stock (or label laminate), for example when provided in roll form as shown in FIG. 4. In a label laminate the backside is the release liner.

EXAMPLES

The following examples are provided for illustrating the properties of the top coating layer and face stocks comprising the top coating layer. At least 5 parallel samples are tested.

Top coatings with the following compositions were tested:

Coating 1 comprising 44-46% of acrylic copolymer emulsion, 14-16% of aliphatic urethane dispersion, 38-40% of aliphatic polyurethane/acrylic dispersion, 0.5-2% of propylene imine, and 0.1% of foam control agent.

Coating 2 comprising 41-43% of acrylic copolymer emulsion, 14-16% of aliphatic urethane dispersion, 41-43% of aliphatic polyurethane/acrylic dispersion, 0.5-2% of propylene imine, and 0.1% of foam control agent.

Test results of optical density, smoothness, top coating and ink adhesion (tape adhesion test/rub off) and blocking of the coating 1 and coating 2 are summarized in Table 1. The tape adhesion test results are relative numerical values in scale 1-5, in which 5 denotes excellent, 4 very good, 3 good, 2 fair and 1 poor. Printing was provided by drawdown. Rub off test results are provided for drawdown printed, dry samples, 20 passes.

Test results of coefficient of friction are summarized in Table 2. Results in Table 2 are average of 3 parallel samples.

The following procedures and methods were used for testing.

Coefficient of Friction was tested according to standard ASTM D1894. Static values are measured as the two surfaces just begin to move against each other.

Blocking test was provided as follows: stacking 5 layers of sample between 2 glass panels, placing 2 kg weight on glass panel, storing the stack in an oven for 1 week at 50° C., cooling the stack and testing if the layers come apart with no resistance.

Tape adhesion tests were provided for measuring the top coating adhesion to the face material surface and ink anchorage to the top coating layer. The test was provided as follows: placing adhesive side of the tape on the film surface and pressing it by hand and left for about 10 seconds, pulling the tape off under consistent force and speed, evaluating the samples if top coating or ink is removed from the film surface. The test was repeated with different tape types of 600, 810 and 610.

Optical density was measured using transmission densitometer. Optical density represents a material's light blocking ability. A unidirectional perpendicular light beam is directed onto the film sample. The light that is transmitted through the film is collected, measured, and logarithmically amplified. The densitometer calculates and displays the optical density value.

Smoothness was tested by air leak smoothness test using Gurley Automatic Densometer & Smoothness Tester. The smoother surface results in a lower Sheffield smoothness value. Results in Table 1 are average of 5 parallel samples.

Rub off test is used for print-abrasion-testing simulated through the scuffing or rubbing resistance of inks. The test is provide by using the standard test method ASTM D-526.

TABLE 1

|  | Optical density (before/dry/IPA) | Smoothness (Sheffield units) | Tape adhesion test top coating/print (drawdown) | Rub off (drawdown, dry, 20 passes) | Blocking |
|---|---|---|---|---|---|
| Coating 1 | 0.36/0.35/0.35 | 7.6 | 600: 4/3<br>810: 3/3<br>610: 3/3 | no change |  |
| Coating 2 | 0.34/0.34/0.34 | 7.2 | 600: 4/4<br>810: 3/3<br>610: 3/3 | no change | no |

TABLE 2

|  | Coefficient of friction (kgF) | | | |
|---|---|---|---|---|
|  | Face to Liner | | Face to Face | |
|  | Static | Dynamic | Static | Dynamic |
| Coating 2;<br>1.6 mil PP face;<br>0.92 PET liner | 0.103 | 0.067 | 0.141 | 0.113 |
| Coating 2;<br>2 mil PP face;<br>1.2 mil PET liner | 0.091 | 0.068 | 0.115 | 0.105 |

With reference to Table 2, coefficient of friction less than 0.15 indicating low resistance to sliding of two surfaces in contact with each other has effect on runnability of the film and label laminate web and performance on roll-fed labelling equipment. For example unwinding of the label web may be enhanced thus enabling e.g. higher printing speeds.

The invention claimed is:

1. An aqueous top coating composition for label face stocks, wherein the top coating comprises:
   10 to 50% of an emulsion of acrylic polymers,
   up to 40% of a dispersion of urethane polymers,
   less than 7% of a cross linker,
   and 15 to 60% of a dispersion of aliphatic polyurethane/acrylic polymer having a solids content of 39 to 41% exhibiting isocyanate (NCO) to hydroxyl (OH) ratio above 1.7.

2. An aqueous top coating composition according to claim 1, wherein the aliphatic polyurethane/acrylic polymer includes 25% of the acrylic polymer.

3. An aqueous top coating composition according to claim 1, wherein the aliphatic polyurethane/acrylic polymer exhibits a peak of glass transition temperature at 57° C.

4. An aqueous top coating composition according to claim 1, wherein the aliphatic polyurethane/acrylic polymer exhibits isocyanate (NCO) to hydroxyl (OH) ratio of 2.

5. An aqueous top coating composition according to claim 1 further comprising a foam control agent.

6. An aqueous top coating composition according to claim 1, wherein the cross linker is propylene imine.

7. An aqueous top coating composition according to claim 5, wherein an amount of the foam control agent is less than 1%.

8. A label face stock comprising a top coating layer of an aqueous top coating composition according to claim 1 on a surface of the face stock.

9. A label face stock according to claim 8, wherein the face stock comprises thermoplastic polymer(s).

10. A label face stock according to claim 8, wherein the top coating layer exhibits static coefficient of friction against a polyethylene terephthalate liner less than 0.15, preferably less than 0.12.

11. A method for providing an aqueous top coating composition according to claim 1 onto a surface of a face stock of a label, wherein the method comprises:
   applying the aqueous top coating composition onto the surface of the face stock,
   drying and curing the aqueous top coating composition during an in line label laminate manufacturing process.

* * * * *